(12) United States Patent
Papst et al.

(10) Patent No.: US 10,953,823 B2
(45) Date of Patent: Mar. 23, 2021

(54) OSCILLATION DECOUPLED CABLE GUIDE DEVICE

(71) Applicant: Kromberg & Schubert GmbH & Co. KG, Renningen (DE)

(72) Inventors: Jana Papst, Ditzingen (DE); Andreas Simolke, Sindelfingen (DE); Joachim Kette, Renningen (DE)

(73) Assignee: Kromberg & Schubert GmbH & Co. KG, Renningen (DE)

( * ) Notice: Subject to any disclaimer, the term of this patent is extended or adjusted under 35 U.S.C. 154(b) by 0 days.

(21) Appl. No.: 16/367,403

(22) Filed: Mar. 28, 2019

(65) Prior Publication Data

US 2019/0299883 A1    Oct. 3, 2019

(30) Foreign Application Priority Data

Mar. 29, 2018 (DE) .................... 10 2018 107 691.6
Jun. 18, 2018 (DE) .................... 10 2018 114 557.8

(51) Int. Cl.
*H02G 1/08* (2006.01)
*B60R 16/02* (2006.01)

(52) U.S. Cl.
CPC .......... *B60R 16/0207* (2013.01); *H02G 1/08* (2013.01)

(58) Field of Classification Search
CPC ... H02G 1/04; H02G 1/06; H02G 1/08; B60R 16/0207

USPC .............. 174/70 R, 71 R, 72 A, 72 C, 72 TR
See application file for complete search history.

(56) References Cited

U.S. PATENT DOCUMENTS

| | | | | |
|---|---|---|---|---|
| 6,069,319 A | * | 5/2000 | Davis, Jr. ................ | B29C 44/12 174/110 F |
| 6,107,569 A | * | 8/2000 | Shields ................ | H02G 3/0487 174/110 F |
| 7,408,115 B2 | * | 8/2008 | Doring ................... | H02G 11/00 174/69 |
| 8,129,621 B2 | * | 3/2012 | Mizutani ............. | B60R 16/0215 174/135 |
| 8,348,204 B2 | * | 1/2013 | Kataoka ................ | H02G 3/088 174/135 |
| 10,286,857 B2 | * | 5/2019 | Inao .................... | B60R 16/0215 |
| 2004/0107533 A1 | * | 6/2004 | Nishihara ............. | H02G 11/00 16/2.1 |
| 2006/0278423 A1 | * | 12/2006 | Ichikawa ............. | H02G 3/0462 174/72 A |

* cited by examiner

*Primary Examiner* — William H. Mayo, III
(74) *Attorney, Agent, or Firm* — Harness, Dickey & Pierce, P.L.C.

(57) ABSTRACT

A cable guide device (1) for a vehicle, with a channel element (10) and a connection element (20) to fasten the channel element (10) to the vehicle. The cable guide device (1) has an elastically deformable decoupling element (30) that is foamed or injected directly onto the channel element (10) and the connection element (20). The decoupling element connects these elements to form a single piece. The connection element (20) is oscillation decoupled from the channel element (10).

7 Claims, 3 Drawing Sheets

OSCILLATION DECOUPLED CABLE GUIDE DEVICE

CROSS-REFERENCE TO RELATED APPLICATIONS

This application which claims priority to German Application No. 10 2018 114 557.8, filed Jun. 18, 2018 and German Application No. 10 2018 107 691.6, filed Mar. 29, 2018. The disclosures of the above applications are incorporating herein by reference.

FIELD

The disclosure relates to a cable guide device for a vehicle and, more particularly, a channel element and a connection element to fasten the channel element to the vehicle. The connection element and the cable element are decoupled from one another by an oscillation decoupling element.

BACKGROUND

Various embodiments of cable guide devices are already known from the prior art. However, in particular on vehicles, they usually do not have their own decoupling device. If oscillations and vibrations occur on the vehicle, they are transmitted undamped to the cable guide device and cause oscillation and vibration of the cable guide device. This is disadvantageous in many ways, since, due to the oscillations and vibrations, the fastening of the cable guide device on the vehicle can be weakened or damaged. In addition, noise is generated which, in the case of a vehicle, can be perceived as disturbing and substandard and thus is not acceptable.

In the prior art, cable guide devices are known that are connected via an elastic bushing to the vehicle. Although vibrations are damped, the vibrations and oscillations can lead to the fact that the bushings, which are usually inserted into an opening, separate from the opening. Thus, the fastening of the cable guide device on the vehicle brought about by the bushing is destroyed. The cable guide device can become completely detached from the vehicle or unfavorable acoustics occur again on the vehicle.

Furthermore, solutions are known where the cable guide device is arranged by means of damping elements on the fastening devices between cable guide device and vehicle. For example, washers, made of rubber or plastic, or other anti-vibration washers are used. However, in the process, a movement of the fastening element such as, for example, of the screw, is enabled. The screw can weaken over time due to the movement. Under some circumstances, this can lead to rupture of the fastening element.

Therefore, the underlying aim of the disclosure is to overcome the above-mentioned disadvantages and provide a cable guide device for a vehicle. Here, the guided cables are oscillation decoupled from the vehicle. The connection of the cable guide device to the vehicle is simultaneously strong and resistant.

SUMMARY

This aim is achieved by the features of a cable guide device for a vehicle, with a channel element and a connection element for fastening the channel element to the vehicle. The cable guide device comprises an elastically deformable decoupling element that is foamed or injected directly onto the channel element and the connection element (20) and which connects these elements to form a single piece, in such a manner that the connection element is oscillation decoupled from the channel element.

According to the disclosure, for this purpose, a cable guide device for a vehicle is proposed where a channel element and a connection element fastens the channel element to the vehicle. The cable guide device includes an elastically deformable decoupling element. The decoupling element is foamed or injected directly onto the channel element and the connection element. The decoupling element connects these elements by direct foaming or injection forming a single piece, in such a manner that the connection element is oscillation decoupled from the channel element.

Oscillation decoupling is understood to mean that an oscillation, a vibration or another movement of one element (connection element or channel element) on another element (channel element or connection element) is damped or weakened by a damper. Here, the decoupling element is used as a damper between the mutually decoupled elements (connection element and channel element). The oscillation, vibration or movement deforms the decoupling element elastically. Thus, a portion of the energy of the oscillation, vibration or movement is converted into deformation or heat energy, which damps the oscillation, vibration or movement. Alternatively, the decoupling element can also be designed so that oscillation frequencies for natural oscillations or oscillation excitations are spaced from or clearly different from the oscillation frequencies or natural frequencies of the connection element and/or channel element. This property can be implemented in particular by the geometric shape as well as by an appropriate positive locking of a notably nonlinear connection surface and thus nonlinear outer contour of the decoupling element.

In addition, an advantageous embodiment provides that the channel element and the connection element in each case comprise a mutually corresponding connection section. The channel element and the connection element are arranged contact-free on one another and are connected to one another on their respective connection sections via the decoupling element.

In order to improve the connection of the connection element and the channel element with the decoupling element, and thus the connection between connection and channel element, an additional advantageous development provides that the connection sections in each case comprise a plurality of protrusions, between which in each case a free space is arranged. A protrusion of the plurality of protrusions of one of the connection sections is in each case arranged so that it protrudes into one of the free spaces of the respective other connection section. The protrusions and the free spaces preferably have a continuous transition between them. The edge course of the connection element or channel element that extends along the protrusions and free spaces is preferably wave shaped, more preferably sine or cosine wave shaped. In addition, the shape of the protrusions of the connection section of the connection element preferably corresponds to the shape of the free spaces of the connection section of the channel element and vice versa. The protrusions of the two connection sections are preferably formed in one plane and have the same thickness. Thus, the protrusions or free spaces of one connection section in each case forms an end face which that faces the protrusions or free spaces of the respective other connection section. Between the end faces, a continuous gap extends. Thus, connection sections or the respective end faces are spaced apart from one another. Preferably, the gap is filled entirely by the decoupling element.

For further improvement of the connection of the decoupling element to the connection element and to the channel element, an advantageous design variant provides that, in several or all of the protrusions a hole is formed in each case, into or through which the decoupling element at least extends.

Another possible and likewise advantageous development provides transverse elements that extend through the holes and run orthogonally to the connection sections without coming in contact with them. The transverse elements are surrounded by the decoupling element. In particular, a transverse element that extends through a hole in the connection section of the connection element can additionally be connected to a transverse element that extends through a hole in the connection section of the channel element.

Also advantageous is a development of the cable guide device, according to the disclosure, where the connection section of the channel element and the connection section of the connection element are spaced apart by a gap. The decoupling element extends entirely through the gap and preferably fills the gap. The gap preferably extends along the end faces of the protrusions and free spaces and follows in its shape the shape of the protrusions and free spaces. If the protrusions and free spaces have a mutually corresponding wave shape or sine or cosine wave shape, the gap also has a sine or cosine wave shape.

The decoupling element preferably has three sections. A first section is within the channel element and formed so as to adjoin the channel element and the connection element. A third section is outside the channel element and formed so as to adjoin the channel element and the connection element. A second section of the decoupling element connects the first and the third section to one another. Thus, the second section includes several connection webs that extend through the holes in the protrusions, to the extent that holes are present. A web, extending through and along the gap, entirely fills the gap. By means of the connection webs extending through the holes, the decoupling element is connected at least by positive locking to the channel element or the connection element. The decoupling element damps movements of the connection element and the channel element. The web extending through the gap represents a separation layer between connection element and channel element. Thus, during a movement toward one another, these elements cannot come in contact with one another and the movement is at the same time damped.

Moreover, an advantageous design variant provides that the channel element is U-shaped and the connection section is formed on a U-arm of the U-shaped channel element. The connection section can protrude with respect to the further course of the U-shaped arm or alternatively can be set back with respect to the further course. Preferably, the connection section in the arm is set back, so that, due to the offset of the connection section of the channel element, a space is formed in the arm of the channel element, that can be filled by or with the connection section of the connection element.

In another advantageous design, the elastic decoupling element is made of PUR (polyurethane). More preferably, the elastic decoupling element is formed from PUR foam or the PUR is foamed. As alternative materials for the decoupling element, EPDM (ethylene propylene diene caoutchouc or rubber) or TPE (thermoplastic elastomers or resilient plastic) can also be used.

Furthermore, according to the disclosure, a method for producing a cable guide device is proposed. In the method, a tool with a tool bottom part and a tool top part is used. The tool bottom part has a shape corresponding to a channel element or a recess with a shape corresponding to the channel element. In the method, the channel element is inserted into the tool bottom part. The channel element and the connection element in each case have a connection section with a plurality of protrusions and in each case free spaces lying in between. The connection element is arranged on the tool bottom part so as to engage the protrusions of its connection section in the free spaces of the connection section of the channel element. The channel element and the connection element will be positioned or are positioned on the tool bottom part forming a gap in a manner so that they do not contact one another. The tool top part is arranged adjoiningly or together with the connection element on the tool bottom part. Thus, the connection sections of the channel element and the connection element lie or are enclosed between the tool top part and the tool bottom part. The tool top part and the tool bottom part form or determine together a cavity between themselves. After the arrangement of the tool top part and the tool bottom part, the connection sections lie in the cavity. Subsequently, a material, preferably PUR, is injected or foamed into the cavity through channels provided in the tool for that purpose. The material forms a decoupling element that connects the channel element and the connection element. The decoupling element is elastically deformable between the elements. The decoupling element, due to its elasticity, shape and/or its specific positive-locking connection, provides the oscillation decoupling.

In another advantageous variant of the method, the channel element protrudes in its longitudinal direction beyond the tool bottom part. Preferably, the tool bottom part is in contact with the outward pointing surfaces of the arms and with the transverse surface connecting the surfaces. The tool top part preferably engages in the interior of the U-shaped channel element. The tool top part presses against the tool bottom part. The tool top part and tool bottom part are in substantially sealing contact with one another and with the U-shaped channel element.

In one design of the method, the material is foamed during the injection in order to form the decoupling element from a foam. The foam here is soft and elastic. Thus, the decoupling element formed from the foam is soft and elastic.

In the case of the use of EPDM, an advantageous variant of the method provides that multiple connection elements are connected to the channel element at the same time. The tool used here provides multiple recesses for the connection elements by means of its tool bottom part and the associated tool top part. Alternatively, tool top part and tool bottom part can be designed in each case to be in multiple parts. In the method used here, it is provided that the cable guide device to be produced comprises multiple connection elements. The channel element for this purpose comprises multiple connection sections. The connection elements in each case include a connection section, with in each case a plurality of protrusions. There is a free space in each case between the connection sections of the connection elements and the connection sections of the channel element. The connection elements are arranged on the tool bottom part so as to engage the protrusions of their respective connection sections in the respective free spaces of the respective connection sections of the channel element. The channel element and the connection elements, in each case, are positioned on the tool bottom part. A gap is formed in such a way that the elements do not contact one another. The tool top part is subsequently arranged on the tool bottom part, enclosing between themselves the connection sections of the channel element and the connection elements between them. The tool top part and the tool bottom part together, in each case, form on each connection element a cavity. After the arrangement of the tool top part on the tool bottom part, the connection sections lie in the cavity. A material, preferably EPDM, is injected or foamed into the cavities. In each case, it forms a decoupling element that connects the channel element and the respective connection element and is elastically deformable between the elements.

By means of a further advantageous method variant, a single-piece cable guide device can be formed. Here, during the injection of the material into the cavity(ies), a material from which the channel element is formed and a material from which the connection element(s) is/are formed are connected non-positively or chemically to one another. This involves a two-component method where a plastic, from which the connection elements and the channel element are formed, for example, PA66 GF30, is connected to the decoupling element that is formed from a thermoplastic elastomer.

The above disclosed features can be combined in any desired manner to the extent that this is technically possible and the features are not mutually contradictory.

DRAWINGS

Other advantageous developments of the disclosure are characterized in the dependent claims or represented in further detail below together with the description of the preferred embodiment of the disclosure in reference to the appended figures. The figures show:

DETAILED DESCRIPTION

Figure 1:
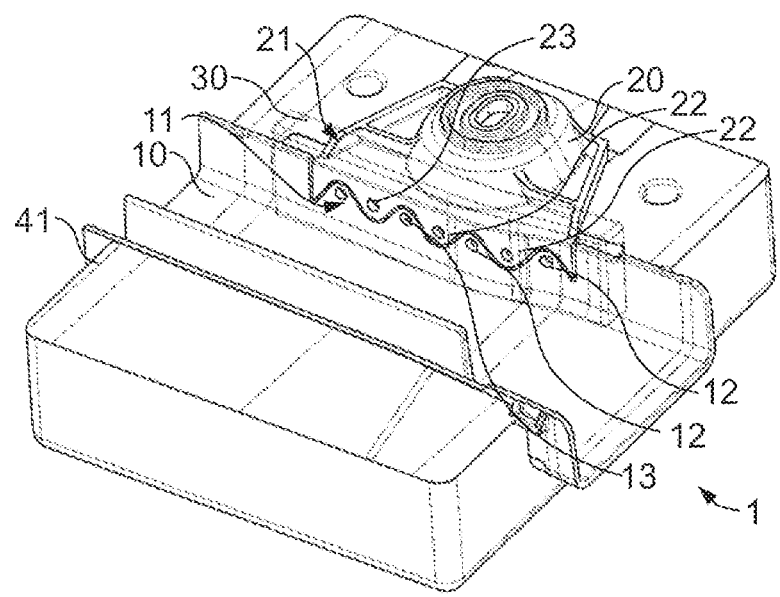
FIG. 1 is a perspective view of a cable guide device accommodated in a tool bottom part.

The figures are diagrammatic examples. Identical reference numerals in the figures refer to functionally and/or structurally equivalent features.

FIGS. 1 to 6 show exemplary embodiments of the cable guide device 1. In each of FIGS. 5 and 6, a cable guide system includes a channel element 10 as shown with multiple connection elements 20 fastened on both sides, where each case is connected via a decoupling element 30.

In FIG. 1, a cable guide device 1 is accommodated or inserted into a tool bottom part 41. The cable guide device 1 includes a channel element 10, a connection element 20, and a decoupling element 30 connecting the channel element 10 to the connection element 20. The channel element 10 is designed with a U-shaped cross section. It extends in its longitudinal direction beyond the tool bottom part 41, which forms a recess for accommodating the channel element 10. The channel element 10 is represented inserted in the recess of the tool bottom part 41. The outer surfaces of the channel element 10 are supported in the area of the tool bottom part 41 by the surfaces of the recess or by the recess. In order to accommodate the channel element 10 in a predetermined position, the channel element 10 has a guide means formed as a catch that engages in a counter-guide means formed in the recess. This establishes the position of the channel element 10 with respect to the tool bottom part 41.

By the formation as a catch, the guide means is formed integrally as a guide and catch means. In the production of the cable guide device 1 respectively in the tool, the catch is used exclusively as guide means and not as catch means. The catch is used later on the cable guide device 1 as catch means, for example, for a cover or another element to be fastened to the channel element 10. On its inner side, the channel element 10 has an intermediate web that can be used, for example, for the improved cable guidance of cables running in the channel element.

As a result of the U-shape of the channel element 10, the channel element 10 has two mutually facing arms and a connecting section connecting the arms and extending perpendicularly to the arms. In addition, on or in one of its arms, the channel element 10 has a connection section 11. The connection section 11 has a plurality of protrusions 12 that lie in the plane of the arm where the connection section 11 is formed. The protrusions 12 transition continuously into one another. Thus, the plurality of protrusions 12 is wave shaped or sine or cosine wave shaped. In the protrusions 12, in each case there is a hole 13 that extends perpendicularly through the respective protrusion 12.

The connection section 11 does not have to lie continuously in one plane. Thus, the protrusions 12 of the connection section 11 of the channel element 10 can lie in mutually offset or non-parallel planes. In addition, a connection element 20 of the cable guide device is inserted in the tool bottom part 41 or attached to the tool bottom part 41. The connection element 20 includes a first and a second section. The first section is used to connect the cable guide device, for example, to a vehicle. The second section forms a connection section 21 and is used to connect the connection element 20 to the channel element 10. In the embodiment examples shown in FIGS. 1 to 6, the sections of the connection elements 20 lie substantially perpendicularly to one another, so that the connection element 20 is L-shaped. For the accommodation of the connection element 20, the tool bottom part 41 has recesses and/or protrusions by which the position of the connection element 20 with respect to the tool bottom part 41 and with respect to the channel element 10 is established.

The connection element 20 has a connection section 21 that is formed correspondingly with respect to the connection section 11 of the channel element 10. As a result of the established position of channel element 10 and the connection element 20 relative to one another in the tool bottom part 41, the protrusions 22 of the connection section 21 of the connection element 20 engage in the recesses or spaces between the protrusions 12 of the connection section 11 of the channel element 10. Thus, channel element 10 and connection element 20 do not contact one another directly. The protrusions 22 of the connection element 20 at least in part also have holes 23 that extend perpendicularly to the respective protrusion 22 through the respective protrusion 22.

The connection section 21 of the connection element 20 extends like the area of the arm of the channel element 10, in which the connection section 11 of the channel element 10 is arranged. The channel element 10 and the connection element 20 are not in contact with one another but instead engage, by means of their respective protrusions 12, 22 in the spaces or recesses between the protrusions 12, 22 of the respective other connection element 11, 21. A small slot or gap is formed between the channel element 10 and the connection element 20. In FIG. 1, the decoupling element 30 of the cable guide device 1 is also represented. In order to better illustrate the connection, the decoupling element 30 is represented transparent. Thus, the connection sections 11, 21 of the channel element 10 and of the connection element 20, that lie in the decoupling element 30, are visible. The decoupling element 30 is formed from an elastic material, directly on the channel element 10 and the connection element 20.

The holes 13, 23 of the protrusions 12, 22 as well as the slot or gap between channel element 10 and connection element 20 is filled by the decoupling element 30. The decoupling element 30 extends beyond the connection sections 11, 21 over a section of the arm of the channel element 10 and over a section of the connection element 20. Thus, it connects them to one another. Due to the elasticity of the decoupling element 30, the channel element 10 and the connection element 20 can move independently of one another within the range of elasticity of the decoupling element 30. Furthermore, movements or oscillations of the channel element 10 or of the connection element 20 are sprung or damped by the decoupling element 30 relative to the respective other element 20, 10. Thus, vibrations or oscillations are not transmitted or are at least are greatly damped.

Figure 2:
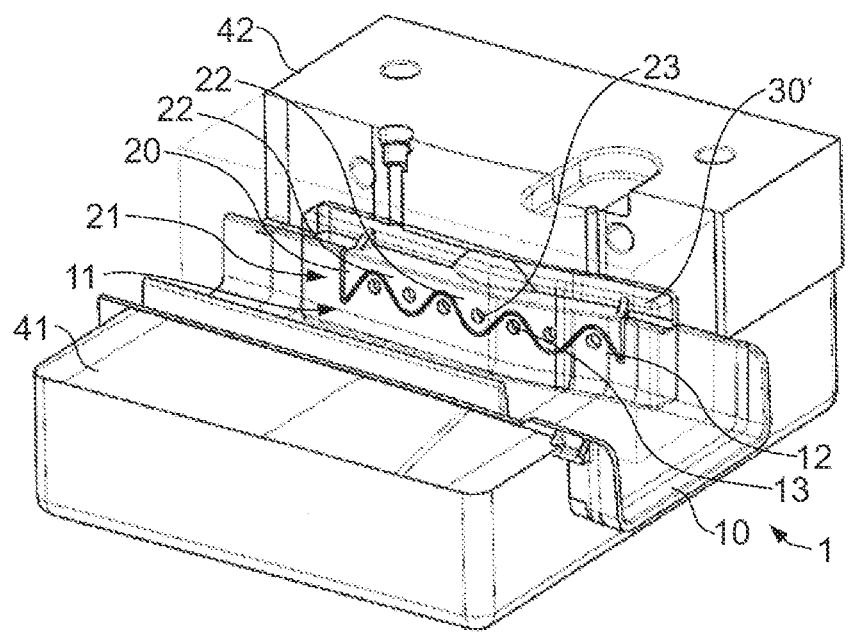
FIG. 2 is a perspective view of a cable guide device accommodated in tool.

In FIG. 2, the cable guide device 1 accommodated in the tool bottom part 41 is substantially represented. A tool top part 42 is arranged on the tool bottom part 41. The tool top part 42 and the tool bottom part 41 form a cavity 30' between themselves for the formation of the decoupling element 30. The channel element 10 and the connection element 20 are in each case arranged between the tool bottom part 41 and the tool top part 42 and fixed with respect to one another. Tool top part and tool bottom part 42, 41 are sealingly pressed onto one another with respect to one another and with respect to the channel element 10 and the connection element 20.

The tool top part is preferably formed in several parts from aluminum. Channels extend in the tool top part 42 toward the cavity 30'. The material that forms the decoupling element 30 is introduced through the channels into the cavity 30' by injection or foaming.

For the production of the cable guide device 1 with a tool including a tool bottom part 41 and a tool top part 42, the channel element 10 is inserted into the tool bottom part 41 and oriented in it. Thus, it is in a predetermined position in the tool bottom part 41. Subsequently, the connection element 20 is introduced and aligned in the tool bottom part 41. Thus, the protrusions 22 of the connection section 21 of the connection element 20 extend between the protrusions 12 of the connection section 11 of the channel element 10. However, the channel element 10 and connection element 20 are not in contact with one another. Subsequently, the tool top part 42 is arranged on the tool bottom part 41. The channel element 10 and the connection element 20 and pressed together. The tool bottom part 41 and tool top part 42, in each case, form a partial cavity, forming together the cavity 30'. The connection sections 11, 21 of the channel element 10 and of the connection element 20 are arranged in the cavity 30'.

The tool bottom part 41 and the tool top part 42 are in sealing contact with one another and with the channel element 10 and the connection element 20. Thus, the material that forms the decoupling element 30 cannot escape from the cavity 30'. The material is subsequently foamed or injected into the cavity 30' through the channels formed in the tool top part 42. The material is distributed into the cavity 30' and air present in the cavity 30' escapes through a ventilation channel. The material is distributed in the cavity 30' and runs through both the gap or slot between the connection sections 11, 21 of the channel element 10 and the connection element 20 as well as through the holes 13, 23 in the protrusions 12, 22 of the connection sections 11, 21 of the channel element 10 and of the connection element 20. The decoupling element 30 forms due to the hardening or solidification of the material.

Figure 3:
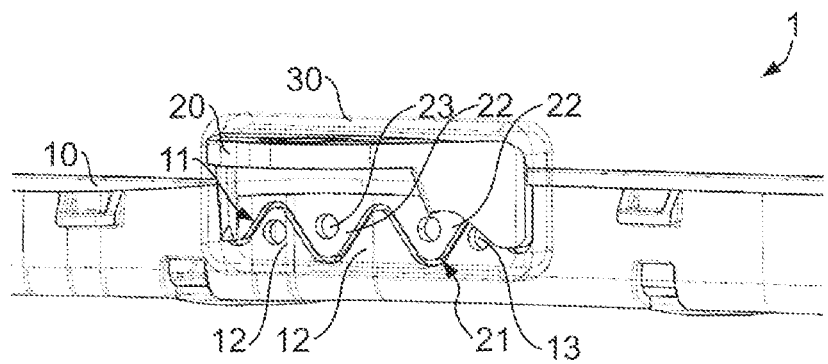
FIG. 3 is a back view in elevation onto a cable guide device.
Figure 4:
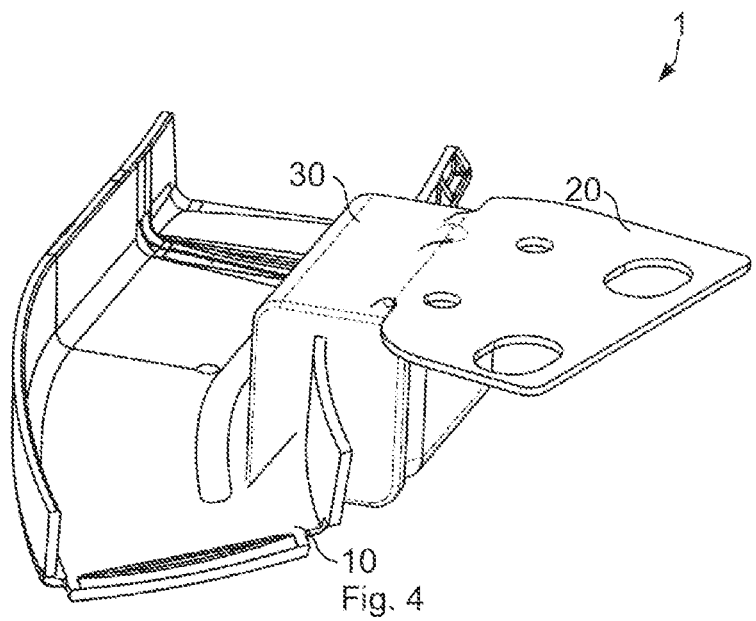
FIG. 4 is a perspective side view onto a cable guide device.

In FIGS. 3 and 4 in each case a cable guide device 1 is represented. The cable guide device 1 in FIG. 3 corresponds substantially to the cable guide devices 1 from FIGS. 1 and 2. The number of the protrusions 12, 22 differs from one to another, and a hole 13 is formed only in some of the protrusions 12 of the plurality of protrusions 12 of the connection section 11 of the channel element 10. The cable guide device 1 in FIG. 4 differs substantially in the design of the connection element 20. The connection element 20 in FIG. 3 is an injected or cast component. The connection element 20 of the cable guide device 1 is bent from a metal plate. In addition, the decoupling element 30 in the cable guide device 1 in FIG. 3 does not extend onto the connection section between the arms of the U-shaped channel element 10. The decoupling element 30 in FIG. 4 completely encloses the arm of the channel element 10 in the area of its connection section 11 and in the process extends over a portion of the connection section.

Figure 5:
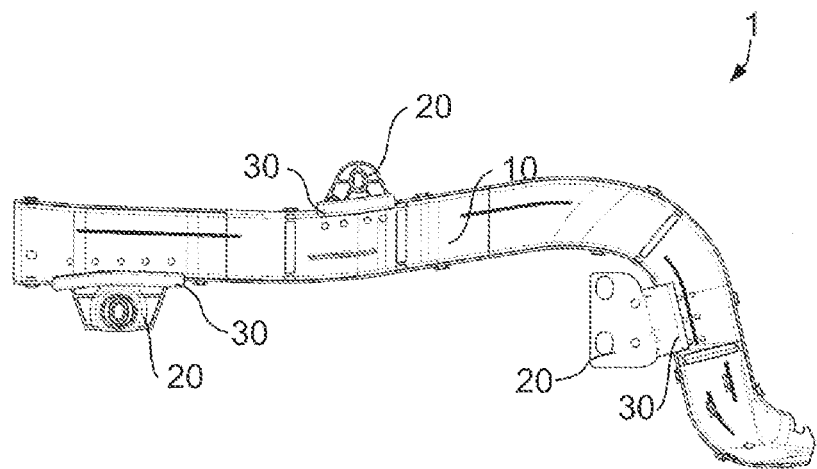
FIG. 5 is a top plan view onto a cable guide system formed from one or more cable guide devices.
Figure 6:
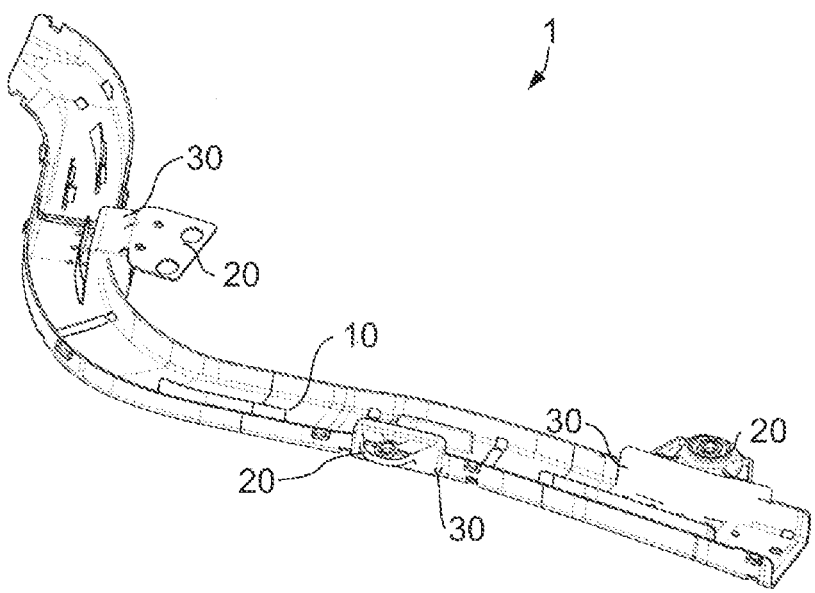
FIG. 6 is a perspective side view onto a cable guide system formed from one or more cable guide devices.

The cable guide systems shown in FIGS. 5 and 6 each includes three cable guide devices 1 whose channel elements 10 are connected to one another or formed integrally and thus in a single piece with one another.

It is particularly advantageous if, as shown in FIGS. 5 and 6, the connection elements 20 and thus the decoupling elements 30 are arranged in each case alternately on the respective one side of the channel element 10 and subsequently on the respective other side (in particular the diametrically opposite side). As a result of such an "alternating" arrangement of the decoupling elements, a particularly good oscillation decoupling is achieved.

The disclosure is not limited in terms of its design to the above-indicated preferred embodiment examples. Instead, a number of variants are conceivable, which make use of the represented solution even in designs of fundamentally different type.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A cable guide device for a vehicle comprising:
a channel element for receiving cables;
a connection element for fastening the channel element to the vehicle, and
an elastically deformable decoupling element, the decoupling element is foamed or injected molded directly onto both the channel element and the connection element, the decoupling element connects the channel element and connection element together to form an integral single piece, in such a manner that the connection element is oscillation decoupled from the channel element by the decoupling element.

2. The cable guide device according to claim 1, wherein the channel element and the connection element have a mutually corresponding connection section, and
the channel element and the connection element are arranged contact-free on one another and are connected to one another on their respective connection sections via the decoupling element.

3. The cable guide device according to claim 2, wherein, in several or all of the protrusions, a hole is formed in each case, into or through which the decoupling element at least extends.

4. The cable guide device according to claim 2, wherein the connection section of the channel element and the connection section of the connection element are spaced apart by a gap and the decoupling element extends through the gap.

5. The cable guide device according to claim 2, wherein the channel element is U-shaped and
the connection section is formed on a U-arm of the U-shaped channel element.

6. The cable guide device according to claim 2, wherein the elastic decoupling element is formed from PUR or EPDM.

7. The cable guide device according to claim 1, wherein the connection sections have a plurality of protrusions between a free space is arranged, and
one protrusion of the plurality of protrusions of one of the connection sections is arranged so that it protrudes into one of the free spaces of the respective other connection section.

* * * * *